US011768215B2

(12) United States Patent
Anderson, Jr. et al.

(10) Patent No.: US 11,768,215 B2
(45) Date of Patent: Sep. 26, 2023

(54) DIGITAL DISPENSE SYSTEM CARTRIDGE

(71) Applicant: FUNAI ELECTRIC CO. LTD., Osaka (JP)

(72) Inventors: James D. Anderson, Jr., Lexington, KY (US); John Glenn Edelen, Lexington, KY (US); Michael A. Marra, III, Lexington, KY (US)

(73) Assignee: Funai Electric Co., Ltd.

( * ) Notice: Subject to any disclaimer, the term of this patent is extended or adjusted under 35 U.S.C. 154(b) by 800 days.

(21) Appl. No.: 16/724,982

(22) Filed: Dec. 23, 2019

(65) Prior Publication Data

US 2020/0217868 A1 Jul. 9, 2020

Related U.S. Application Data

(60) Provisional application No. 62/788,290, filed on Jan. 4, 2019.

(51) Int. Cl.
*G01N 35/10* (2006.01)
*B01L 3/02* (2006.01)

(52) U.S. Cl.
CPC ........ *G01N 35/1074* (2013.01); *B01L 3/0268* (2013.01); *B01J 2219/00394* (2013.01); *B01J 2219/00695* (2013.01); *G01N 2035/1041* (2013.01)

(58) Field of Classification Search
None
See application file for complete search history.

(56) References Cited

U.S. PATENT DOCUMENTS

| 3,568,735 | A | * | 3/1971 | Lancaster | B01L 3/0217 141/238 |
| 6,001,309 | A | | 12/1999 | Gamble et al. | |
| 6,372,185 | B1 | * | 4/2002 | Shumate | B01L 9/523 422/510 |
| 6,547,358 | B1 | | 4/2003 | Tanaka et al. | |
| 6,627,157 | B1 | | 9/2003 | Doktycz et al. | |
| 6,818,394 | B1 | * | 11/2004 | O'Donnell-Maloney | C07H 21/00 435/177 |
| 7,024,281 | B1 | * | 4/2006 | Unno | G01N 35/1074 422/50 |
| 7,135,146 | B2 | | 11/2006 | Johnson et al. | |

(Continued)

FOREIGN PATENT DOCUMENTS

| CN | 1799841 A | 7/2006 |
| EP | 2179025 B1 | 10/2016 |
| JP | 2008151594 A | 7/2008 |

*Primary Examiner* — Brian R Gordon
(74) *Attorney, Agent, or Firm* — Luedeka Neely Group, PC

(57) ABSTRACT

An open fluid droplet ejection cartridge containing one or more fluids to be dispensed by digital fluid dispense system and a method for digitally dispensing fluids. The open fluid droplet ejection cartridge includes a cover having one or more openings therein, fluid funnels pending from each of the one or more openings in the cover, a chamber separator attached to the fluid funnels for directing fluid to one or more fluid chambers, a fluid overflow chamber for fluid overflow from the one or more fluid chambers, fluid vias associated with each of the one or more fluid chambers, and a plurality of fluid ejection devices adjacent to the fluid vias on a single semiconductor substrate in fluid flow communication with the fluid vias.

17 Claims, 11 Drawing Sheets

(56) References Cited

U.S. PATENT DOCUMENTS

| | | |
|---|---|---|
| 7,199,809 B1 | 4/2007 | Lacy et al. |
| 7,401,879 B2 | 7/2008 | Isono et al. |
| 7,568,779 B2 | 8/2009 | Soma |
| 7,909,424 B2 | 3/2011 | Giri et al. |
| 8,201,913 B2 | 6/2012 | Govyadinov et al. |
| 8,210,633 B2 | 7/2012 | Suzuki |
| 8,540,332 B2 | 9/2013 | Shibata |
| 8,807,676 B2 | 8/2014 | Yoshida |
| 8,959,448 B2 | 2/2015 | Cappione et al. |
| 9,075,034 B2 | 7/2015 | Glauser et al. |
| 9,199,463 B2 | 12/2015 | Nishikawa |
| 9,224,952 B2 | 12/2015 | Harjee et al. |
| 9,492,999 B2 * | 11/2016 | Ward .................. B41J 2/0458 |
| 10,139,319 B2 | 11/2018 | Kubota et al. |
| 2002/0121529 A1 | 9/2002 | Hoummady |
| 2002/0176803 A1 * | 11/2002 | Hamel ............... G01N 35/1002 422/511 |
| 2003/0026737 A1 | 2/2003 | Inoue |
| 2004/0021068 A1 * | 2/2004 | Staats .................. B01L 3/5027 250/288 |
| 2005/0238544 A1 | 10/2005 | Briscoe et al. |
| 2006/0057710 A1 | 3/2006 | Ishiura et al. |
| 2006/0102477 A1 * | 5/2006 | Vann ............... G01N 27/44743 204/450 |
| 2006/0153621 A1 | 7/2006 | Manning |
| 2007/0056351 A1 | 3/2007 | Curtis et al. |
| 2007/0185657 A1 | 8/2007 | Lacy et al. |
| 2008/0305969 A1 | 12/2008 | Dijksman et al. |
| 2009/0033692 A1 | 2/2009 | Giri et al. |
| 2009/0047440 A1 | 2/2009 | Giri et al. |
| 2009/0117620 A1 | 5/2009 | Fritchie et al. |
| 2010/0199788 A1 | 8/2010 | Ayliffe et al. |
| 2010/0322822 A1 * | 12/2010 | Fritchie .............. G01N 35/1009 422/63 |
| 2013/0105042 A1 | 5/2013 | Brown et al. |
| 2014/0112839 A1 | 4/2014 | Richardson |
| 2015/0045234 A1 * | 2/2015 | Stone ................ B01L 3/502738 435/6.1 |
| 2015/0210075 A1 | 7/2015 | Nishikawa |
| 2016/0238623 A1 | 8/2016 | Sun et al. |
| 2017/0043336 A1 | 2/2017 | Khattak et al. |
| 2018/0272345 A1 | 9/2018 | Higuchi et al. |
| 2018/0272770 A1 | 9/2018 | Tobita |
| 2019/0212350 A1 | 7/2019 | Wolton |
| 2021/0165007 A1 | 6/2021 | Nielsen et al. |

* cited by examiner

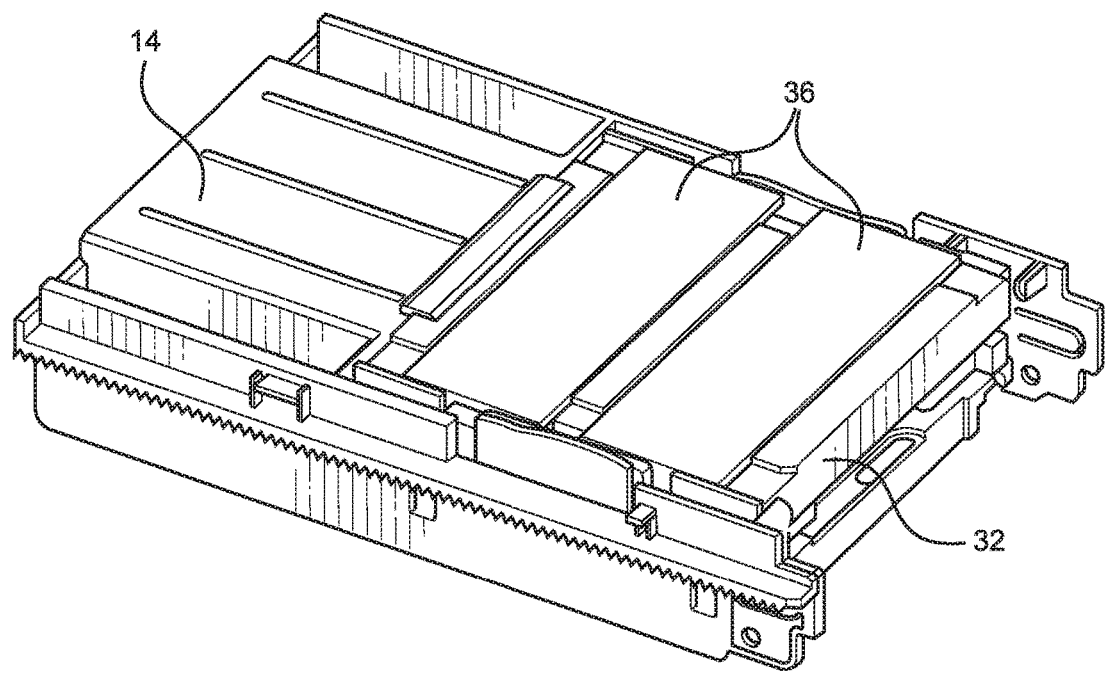
FIG. 7
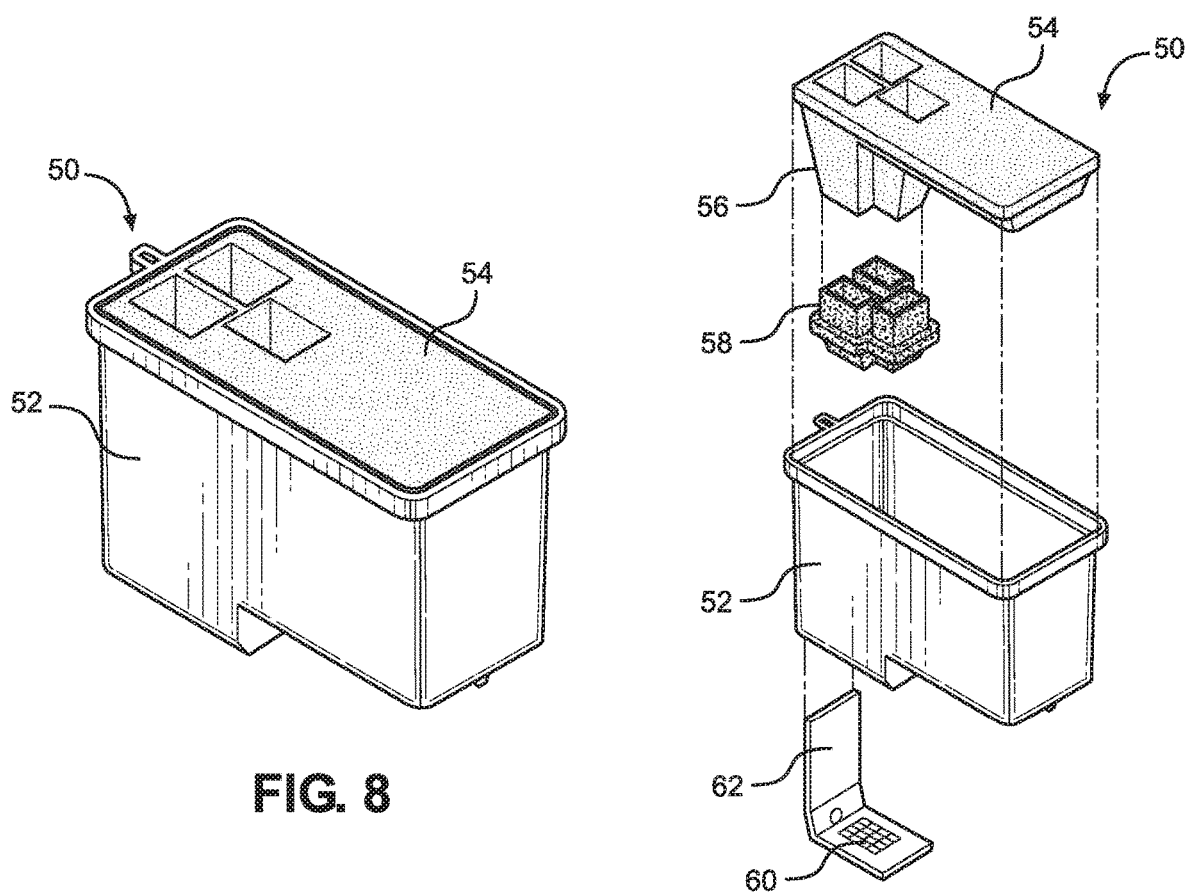
FIG. 8
FIG. 9

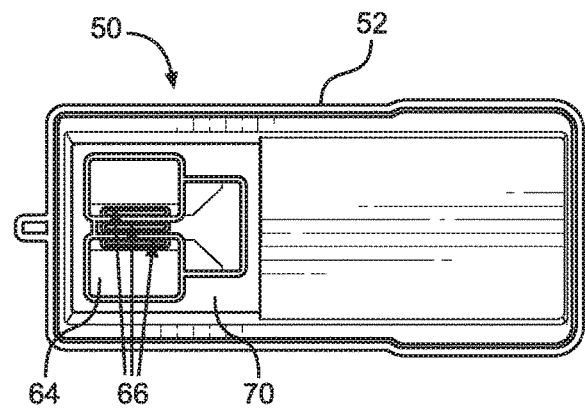
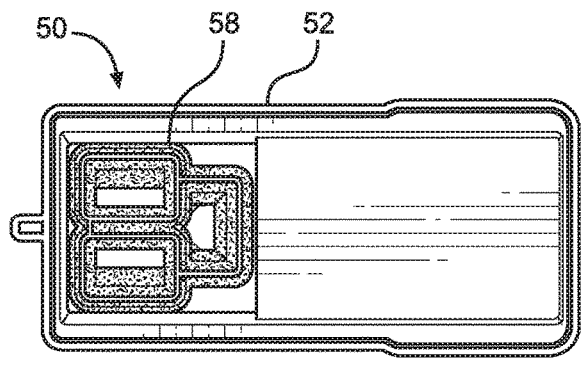
FIG. 10        FIG. 11
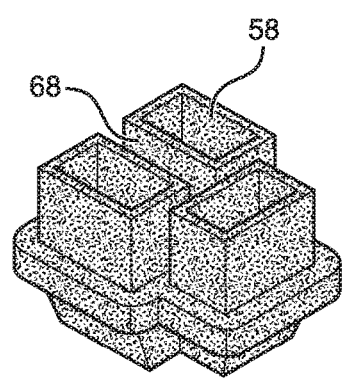
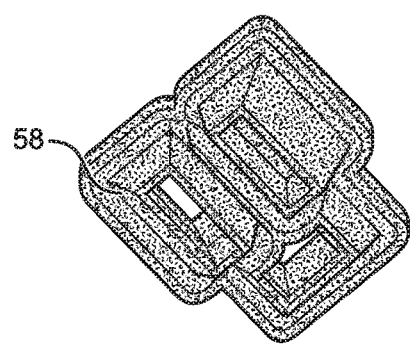
FIG. 12        FIG. 13

DIGITAL DISPENSE SYSTEM CARTRIDGE

RELATED APPLICATION

This application is related to provisional application Ser. No. 62/788,290, filed Jan. 4, 2019, now pending.

TECHNICAL FIELD

The disclosure is directed to devices and methods that are used to accurately dispense one or more fluids onto or into precise areas of a substrate for performing analysis of samples confined to the precise areas of the substrate or for building up layers of material in predetermined areas on the substrate.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. In the analysis of blood, for example, blood is analyzed to provide a number of different factors that are used to determine the health of an individual. When there are a large number of patients that require blood sample analysis, the procedures may be extremely time consuming. Also, there is a need for accurate preparation of the samples so that the results can be relied on. There are many other situations that require sample analysis in the medical field and in other fields that can benefit from the use of analytical instruments that provide accurate and reproduceable results, such as micro-titration of multiple samples.

Well plates, slides and other substrates are used for many experiments and laboratory procedures. The process of filling the wells or spotting is often performed manually or using expensive lab equipment. In some cases, the wells are filled with hand operated pipettes. In other cases, high-end automated devices based on pipette technology are used to fill the well plates. Such automated devices accommodate an open well dispense head only. The open well dispense head is a dispense head where a small amount of fluid must be deposited into an opening in the dispense head before use. The fluid is typically deposited manually using a pipette or similar means. The dispense head is held stationary while moving the microplate in both X and Y directions. Such high end devices are extremely expensive.

In the areas of micro-circuit manufacture, fluids are required to be dispensed in precise locations to provide circuit devices on a substrate. The volume of fluid dispensed per unit area is typically much greater than can be provided by conventional ink jet printing technology. In some cases, different fluids are combined together on the substrate to provide a chemical or physical change to the fluids so that the resulting material performs a desired circuit function.

Other areas of micro-manufacturing may also require the precise deposit of fluids into or onto a substrate. There is thus the need for a method and device that can be used to dispense and a predetermine volume of one or more fluids onto a substrate. There is also a need for a low cost system that can dispense multiple fluids in precise locations using versatile fluid ejection cartridges that can be easily exchanged in the system.

In view of the foregoing, an embodiment of the disclosure provides an open fluid droplet ejection cartridge containing one or more fluids to be dispensed by digital fluid dispense system and a method for digitally dispensing fluids. The open fluid droplet ejection cartridge includes a cover having one or more openings therein, fluid funnels pending from each of the one or more openings in the cover, a chamber separator attached to the fluid funnels for directing fluid to one or more fluid chambers, a fluid overflow chamber for fluid overflow from the one or more fluid chambers, fluid vias associated with each of the one or more fluid chambers, and a plurality of fluid ejection devices adjacent to the fluid vias on a single semiconductor substrate in fluid flow communication with the fluid vias.

In another embodiment there is provided a method for digitally dispensing fluids. The method includes providing a fluid droplet ejection system housed in a compact housing unit The fluid droplet ejection system contains:

- an open fluid droplet ejection cartridge containing one or more fluids to be dispensed by the fluid droplet ejection system,
- a fluid cartridge translation mechanism for moving the fluid droplet ejection cartridge back and forth over a substrate in an x direction, and
- a substrate translation mechanism for moving the substrate back and forth beneath the fluid ejection cartridge in a y direction orthogonal to the x direction,
- wherein the open fluid droplet ejection cartridge comprises one or more fluid chambers for one or more different fluids to be ejected from the fluid droplet ejection cartridge and a fluid overflow chamber for each of the one or more fluid chambers;

One or more fluids is pipetted into the one or more fluid chambers of the open fluid droplet ejection cartridge. The fluid droplet ejection system is activated to digitally dispense one or more fluids onto the substrate.

In some embodiments, the substrate translation mechanism for the fluid droplet ejection system includes one or more adapters for holding the substrate.

In other embodiments, the open fluid droplet ejection cartridge includes a single semiconductor substrate containing a plurality of fluid vias and ejection devices associated with the plurality of fluid vias. In other embodiments, the single semiconductor substrate comprises four fluid vias disposed in a two-dimensional matrix on the single semiconductor substrate.

In some embodiments, an air gap is disposed between the chamber separator and the fluid funnels to exhaust air from the one or more fluid chambers during fluid chamber filling.

In some embodiments, the open fluid droplet ejection cartridge includes three or four fluid chambers for three or four different fluids to be dispensed by the digital dispense system. In other embodiments, the open fluid droplet ejection cartridge contains a cover having three or four openings corresponding to the three or four fluid chambers.

In some embodiments, the open fluid droplet ejection cartridge includes a single semiconductor substrate containing three fluid vias disposed in a one-dimensional matrix on the single semiconductor substrate.

Some embodiments provide a digital fluid dispense system, wherein the digital fluid dispense system includes a compact housing unit, an open fluid droplet ejection cartridge, a fluid cartridge translation mechanism for moving the open fluid droplet ejection cartridge back and forth over a substrate in an x direction, and a substrate translation mechanism for moving the substrate back and forth beneath the open fluid droplet ejection cartridge in a y direction orthogonal to the x direction.

In some embodiments, the digital dispense system includes one or more sealed fluid droplet ejection cartridges disposed on the fluid cartridge translation mechanism in combination with one or more open fluid droplet ejection cartridges.

An advantage of the disclosed embodiments is that it provides unique low-cost cartridges for digitally dispensing fluids that can be used for a variety of fluid dispense applications and can be adapted to a wide variety of fluids to be dispensed.

BRIEF DESCRIPTION OF THE DRAWINGS

FIG. 7 is a perspective view, not to scale, of the tray of FIG. 4 holding a slide adapter and slides for the dispense system of FIG. 1.

FIG. 8 is a perspective view, not to scale, of an open fluid droplet ejection cartridge according to an embodiment of the disclosure.

FIG. 9 is an exploded view, not to scale of the open fluid droplet ejection cartridge of FIG. 8.

FIG. 10 is a top plan view, not to scale, of fluid chambers in the open fluid droplet ejection cartridge of FIG. 8.

FIG. 11 is a top plan view, not to scale, of a chamber separator disposed in the open fluid droplet ejection cartridge of FIG. 8.

FIG. 12 is a top perspective view, not to scale of a fluid separator for the open fluid droplet ejection cartridge of FIG. 8.

FIG. 13 is a bottom perspective view, not to scale of a fluid separator for the open fluid droplet ejection cartridge of FIG. 8.

DETAILED DESCRIPTION OF EXEMPLARY EMBODIMENTS

Figure 1:
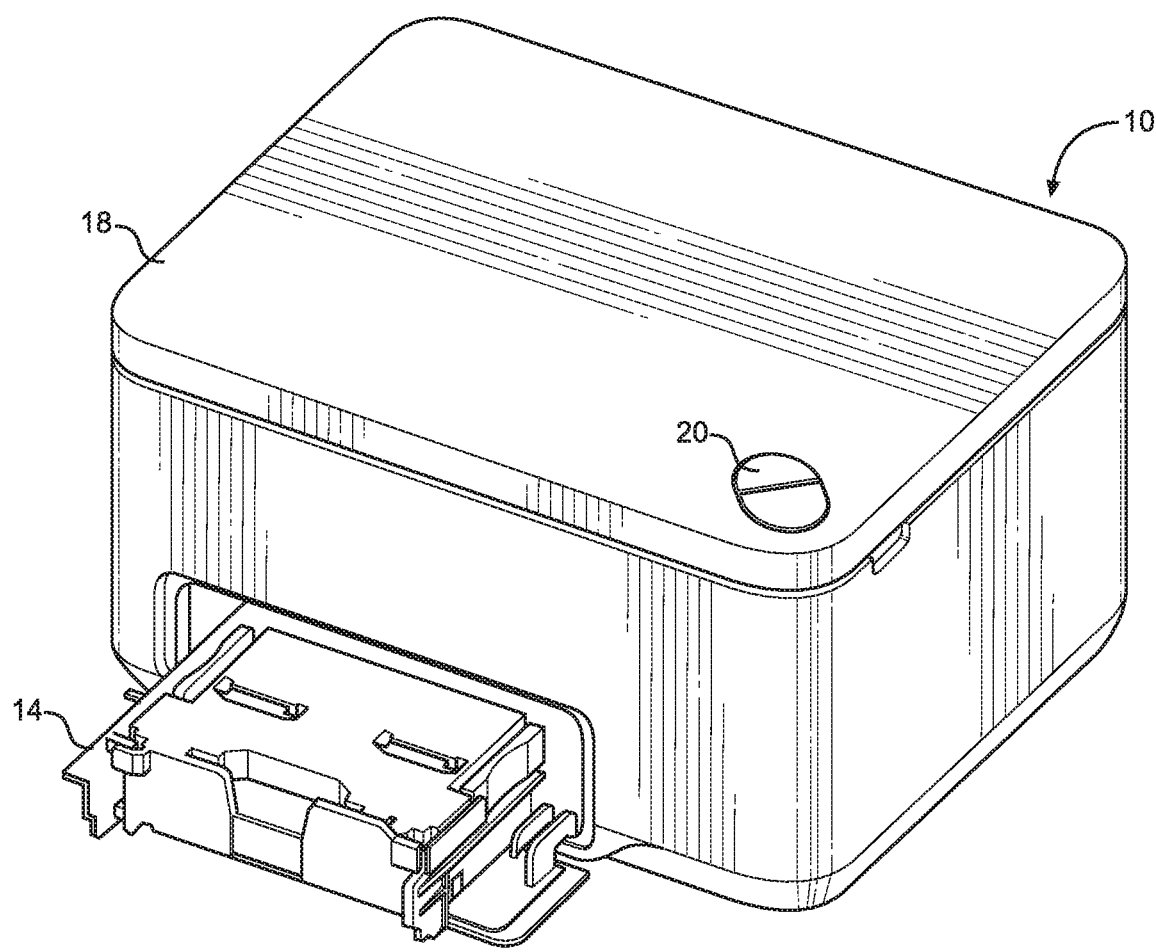
FIG. 1 is a perspective view, not to scale, of a digital dispense system according to an embodiment of the disclosure.
Figure 2:
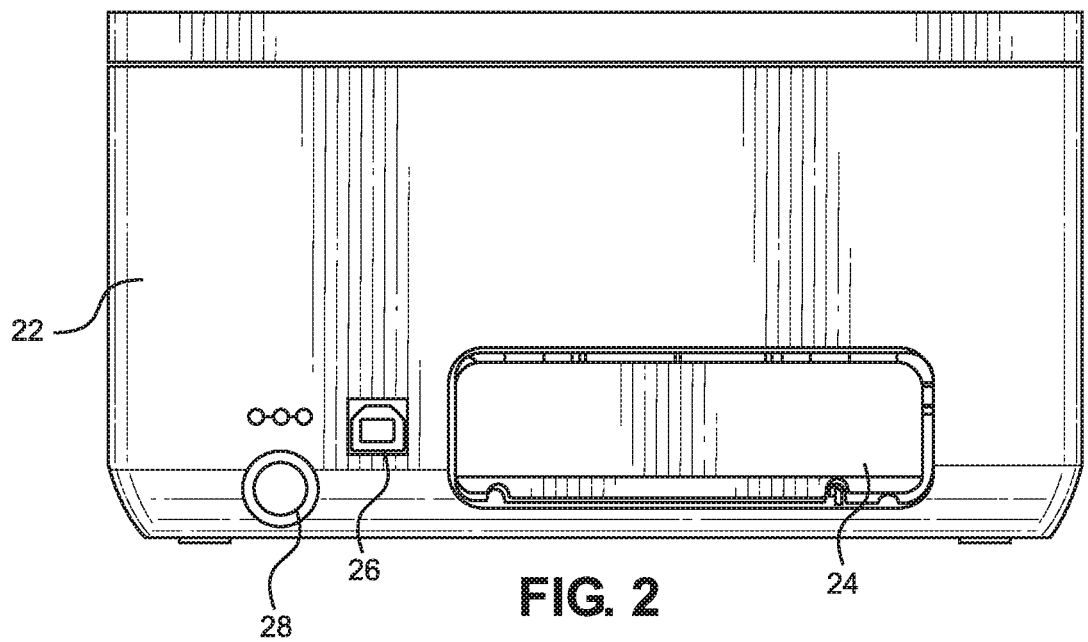
FIG. 2 is an elevational view, not to scale, of a back side of the digital dispense system of FIG. 1.
Figure 3:
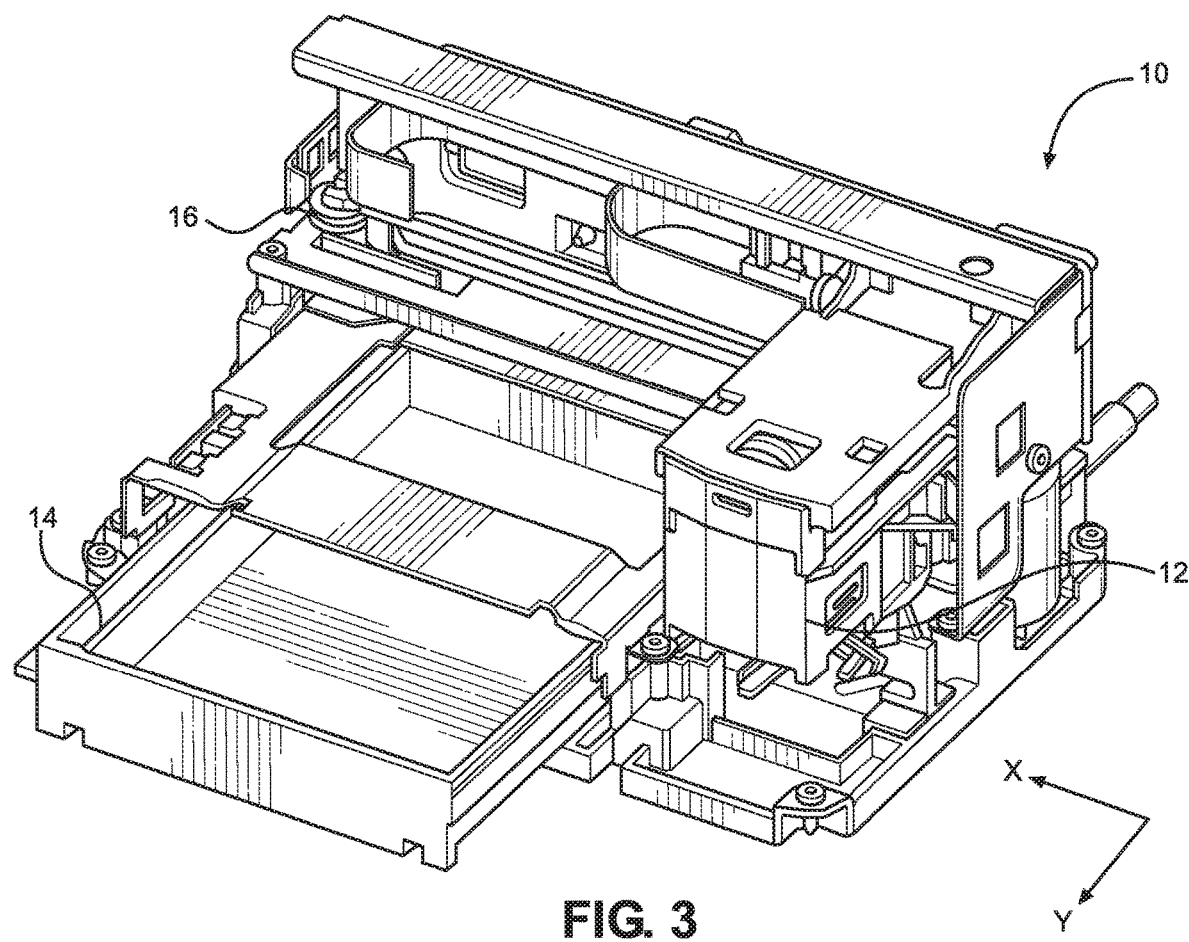
FIG. 3 is a perspective cutaway view, not to scale, of the digital dispense system of FIG. 1.

With reference to FIGS. 1-7 there is shown a digital dispense device 10 for accurately dispensing an amount of one or more fluids onto a substrate. Unlike the high-end digital dispense devices, the device 10 of the present invention is based on an ejection head that moves back and forth in a first direction and a tray 14 for moving a substrate that moves back and forth in a second direction orthogonal to the first direction, as described in more detail below. The disclosed device 10 can accept open and closed dispense heads rather than just open dispense head. The tray 14 is adaptable to a wide variety of substrates including, but not limited to, micro-well plates, glass slides, electronic circuit boards and the like.

The dispense head cartridge 12 and head movement mechanism 16 (FIG. 3) are contained in a rectangular prism-shaped box 18. An activation switch 20 is included on the box 18 for activating the device 10. A rear side 22 of the box 18 (FIG. 2) includes an opening 24 for movement of the tray 14 through the box 18 in the second direction to dispense fluid onto a substrate. A USB port 26 is provided on the rear side 22 of the box 18 to connect the digital dispense system 10 to a computer or a digital display device. Power is provided to the system 10 through a power input port 28 on the rear side 22 of the box 18.

Figure 4:
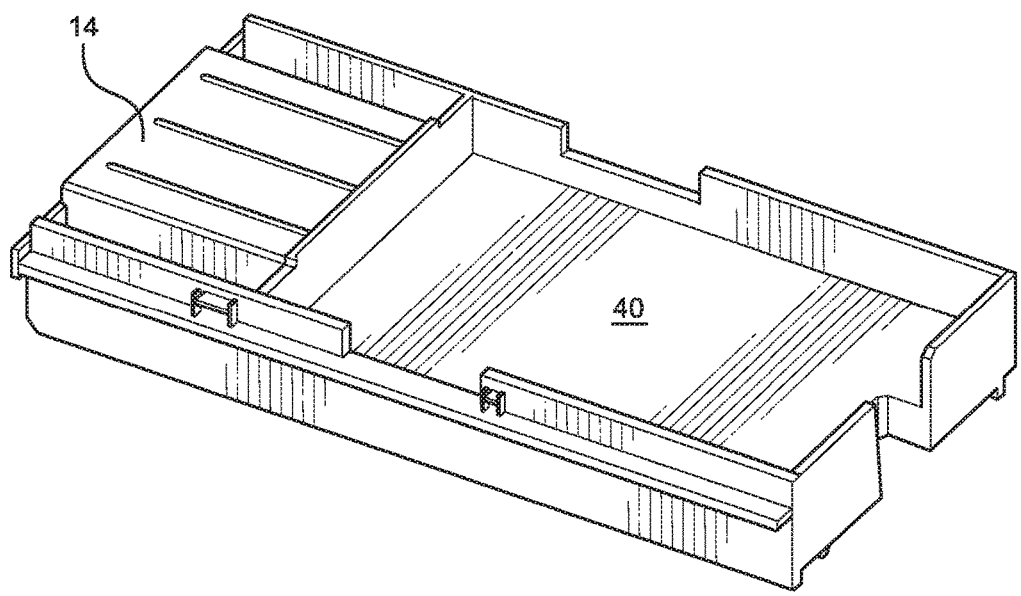
FIG. 4 is a perspective view, not to scale, of a tray for holding a substrate for use with the digital dispense system of FIG. 1.
Figure 5:
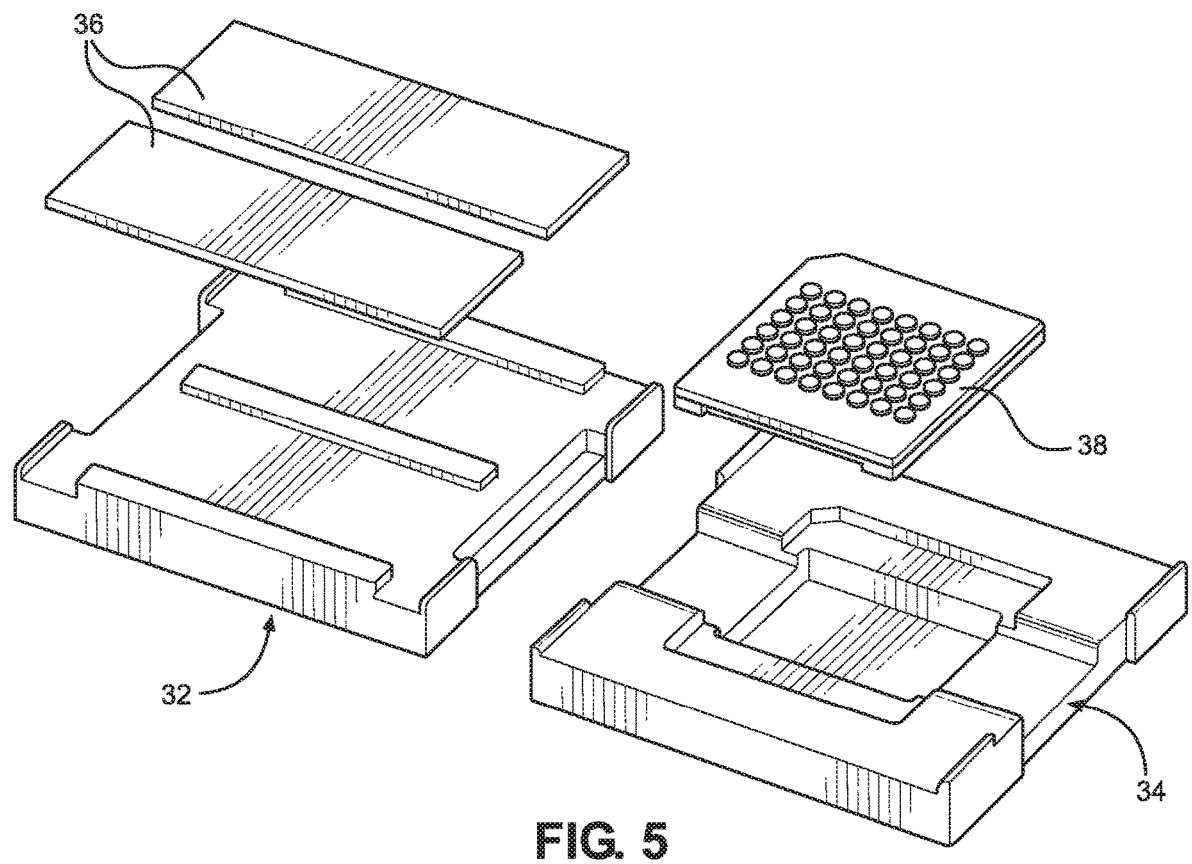
FIG. 5 is a perspective view, not to scale, of adapters for slides and microwell plates for use with the tray of FIG. 4.
Figure 6:
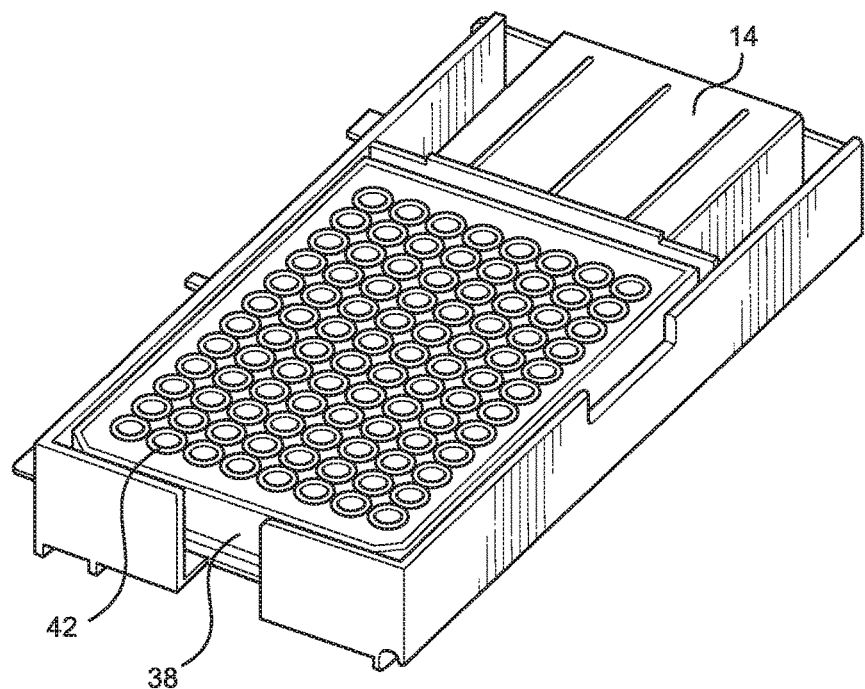
FIG. 6 is a perspective view, not to scale, of the tray of FIG. 4 holding a microwell plate for the dispense system of FIG. 1.

The tray 14 and adapters 32 and 34 for the tray are illustrated in FIGS. 4 and 5. The adapter 32 is sized to hold glass slides 36 and the well plate adapter 34 is sized to hold a micro-well plate 38. The tray 14 has a recessed area 40 for holding the adapters 32 and 34 or a substrate for dispensing fluids thereon. FIG. 6 illustrates a well plate 38 containing wells 42 disposed in the recessed area 40 of the tray 14. FIG. 7 illustrates slides 36 on the slide adapter 32 in the tray 14.

Fluid cartridges and components thereof for use with the digital dispense device 10 of FIG. 1 are illustrated in FIGS. 8-24. FIG. 8 is a perspective view, not to scale of an open fluid droplet ejection cartridge 50 according to one embodiment of the disclosure. The open fluid droplet ejection cartridge 50 includes a cartridge body 52 and a cover 54. FIG. 9 is a perspective exploded view of the open fluid droplet ejection cartridge of FIG. 8, showing fluid funnels 56 pending from the cover 54 and a chamber separator 58 for directing fluid to an ejection head substrate 60. The ejection head substrate 60 is attached to a flexible circuit 62 for activating ejection devices on the ejection head substrate 60. The ejection devices on the ejection head substrate 60 are disposed adjacent to a one-dimensional array of fluid supply slots 66 as illustrated below in FIG. 10.

Figure 14:
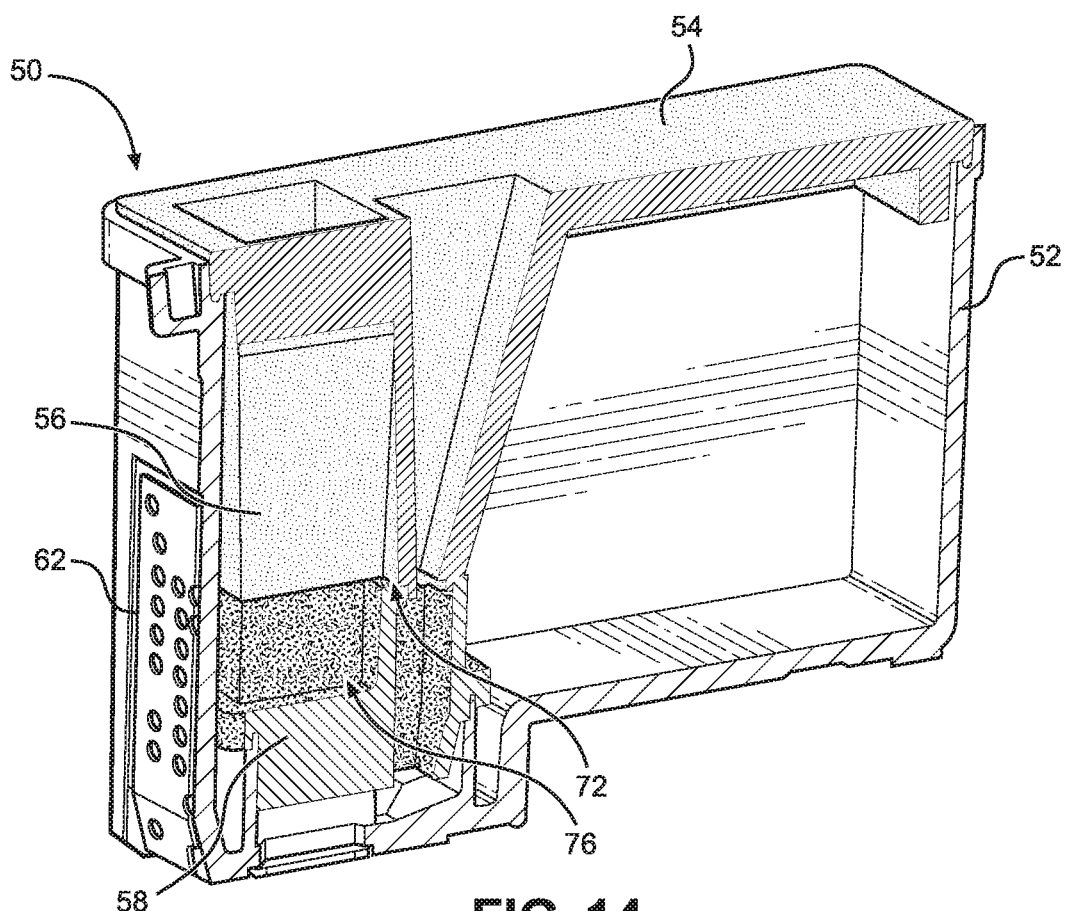
FIG. 14 is a cut-away, perspective view, not to scale of the open fluid droplet ejection cartridge of FIG. 8.

FIGS. 10 and 11 are top plan views of the open fluid droplet cartridge 50 with the cover 54 removed showing one or more fluid chamber 64 (FIG. 10) and the chamber separator 58 disposed in the cartridge body 52. Further details of the chamber separator 58 are illustrated in FIG. 12 (to perspective view) and FIG. 13 (bottom perspective views). The chamber separator 58 directs fluid from the fluid funnels 56 toward side-by-side supply slots 66 (FIG. 10) in the ejection head substrate 60 for fluid ejection by a plurality of ejection heads adjacent to the fluid supply slots 66. The ejection devices may be conventional resistive heater type ejection devices, bubble pump ejection devices, piezoelectric ejection devices. A feature of the chamber separator 58 is the provision of a gap 68 in the chamber separator that directs overflow of fluid from the fluid funnels 56 to an overflow area 70 (FIG. 10) of the cartridge body 52. FIG. 14 illustrates that the fluid funnels 56 are slightly larger than the chamber separator 58 in area 72, so that if the fluid chambers 64 are overfilled, the fluid flows over the top of the chamber separator 58 into the gap 68 where it can mix with other overflow fluids thus avoiding possible contamination between the fluids. The overflow area 70 is in an unused area of the cartridge body 52.

Figure 15:
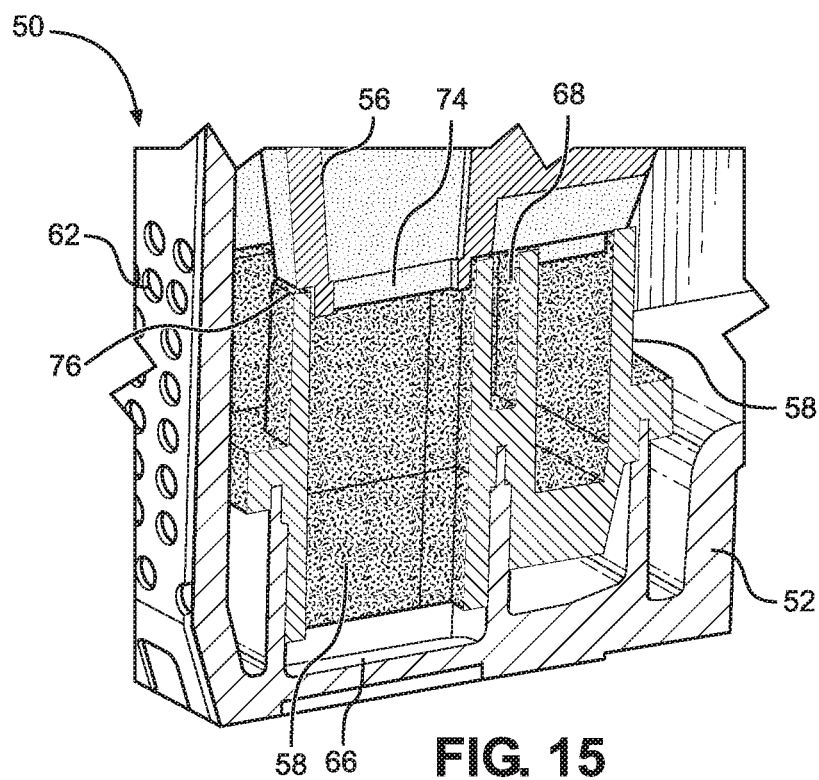
FIG. 15 is a partial cut-away, perspective view, not to scale of the open fluid droplet ejection cartridge of FIG. 8.

FIG. 15 provides further illustration of the open fluid droplet ejection cartridge 50. In FIG. 15, the funnels 56 have a perimeter 74 adjacent to the chamber separator 58, that is slightly larger than the perimeter 76 of the chamber separator 58. Accordingly, if too much fluid is added to the fluid chambers 64, the flow will overflow into the gap 68. The perimeter 74 of the funnels 56 being smaller than the perimeter of the chamber separator 58 also promotes the release of air from the fluid as the fluid chambers 64 are filled. The difference in size of the perimeters of the funnels 56 and chamber separator 58 may be tailored to the viscosity and surface tension of the fluid being disposed into the fluid chambers 64.

Figure 16:
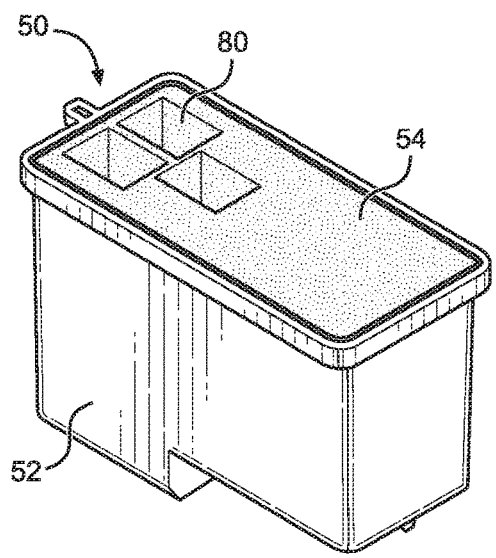
FIGS. 16 and 17 are perspective views, not to scale of alternative covers for the open fluid droplet ejection cartridge of FIG. 8.
Figure 17:
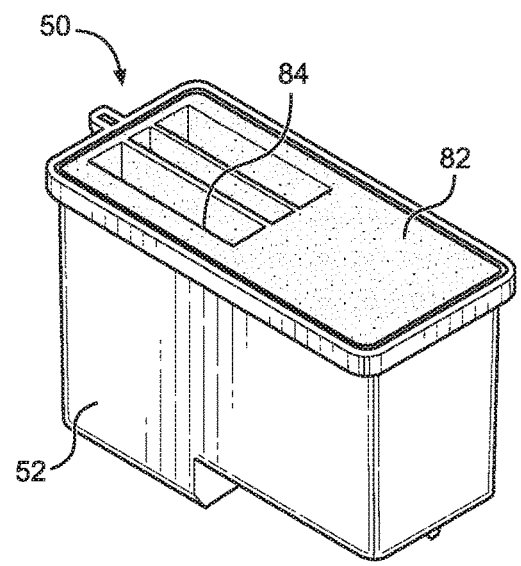
Figure 18:
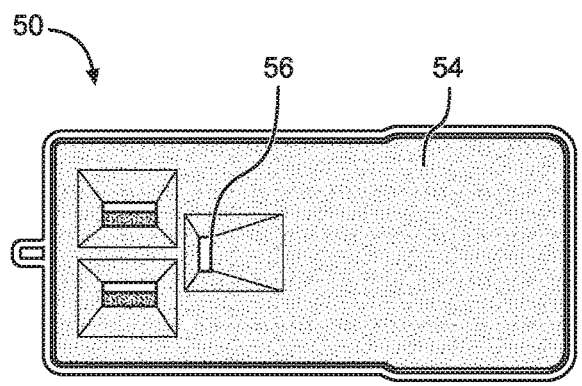
FIGS. 18 and 19 are top plan views, not to scale of the alternative covers of FIGS. 16 and 17, respectively.
Figure 19:
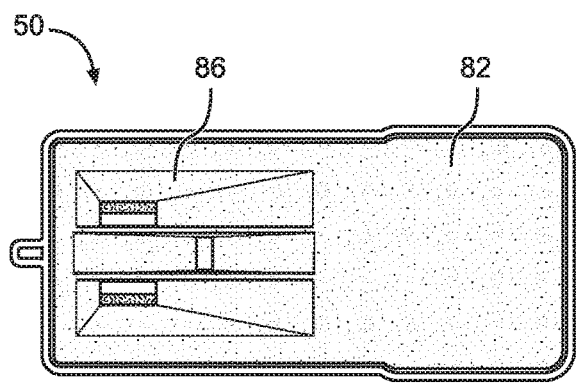
Figure 20:
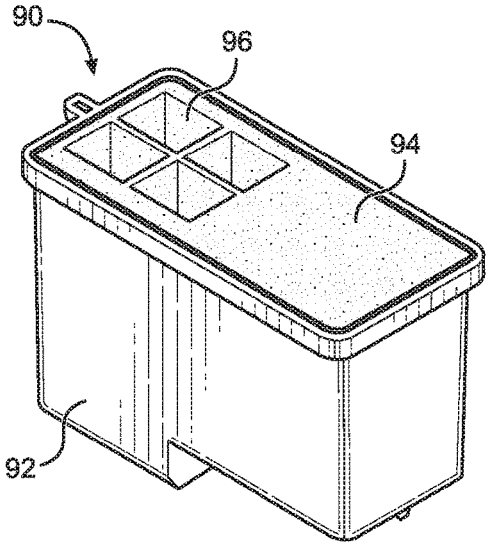
FIG. 20 is a perspective view, not to scale, of an open fluid droplet ejection cartridge according to another embodiment of the disclosure.
Figure 21:
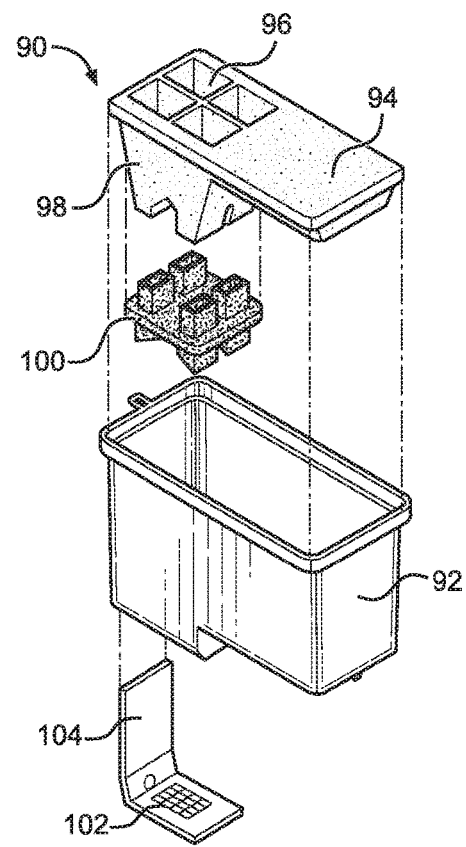
FIG. 21 is an exploded view, not to scale of the open fluid droplet ejection cartridge of FIG. 20.

FIGS. 16-19, illustrate alternative openings in the cover of the open fluid droplet ejection cartridge 50. In FIG. 16, the openings 80 are disposed in the cover 54 in a two-dimensional array. In FIG. 17, the cover 82 contains parallel rectangular openings 84 that are each larger than the openings 80 in cover 54. Accordingly, as shown in FIGS. 18 and 19, the funnels 56 pending from cover 54 are substantially smaller than the funnels 86 pending from cover 82. Both embodiments provide cover designs with relatively large, deep fluid funnels 56 and 86 that may be effective to reduce errors when manually filling the open fluid droplet ejection cartridges 50 and 90 with a pipette.

With reference to FIGS. 20-29, an alternative open fluid droplet ejection cartridge 90 is illustrated. Like the previous embodiment, the open fluid droplet ejection cartridge 90 includes a cartridge body 92 and a cover 94. However, unlike the open fluid droplet ejection cartridge 50, the open fluid droplet ejection cartridge 90 includes four openings 96 in the cover 94. Accordingly, there are four fluid funnels 98 pending from the cover 94. Likewise, the chamber separator 100 disposed in the cartridge body 92 is designed for channeling four fluids to fluid vias etched through the semiconductor substrate 102. As before, a flexible circuit 104 provides electrical connection to the semiconductor substrate 102 for activating ejection devices adjacent to fluid vias etched through the semiconductor substrate 102.

Figure 22:
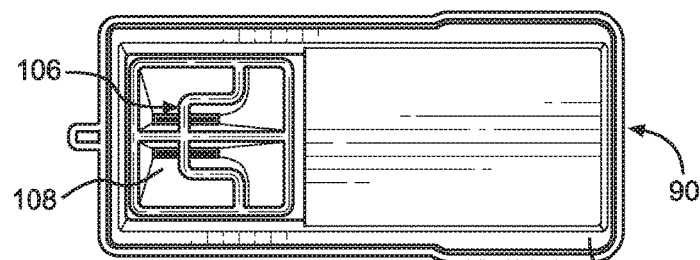
FIG. 22 is a top plan view, not to scale, of fluid chambers in the open fluid droplet ejection cartridge of FIG. 20.
Figure 23:
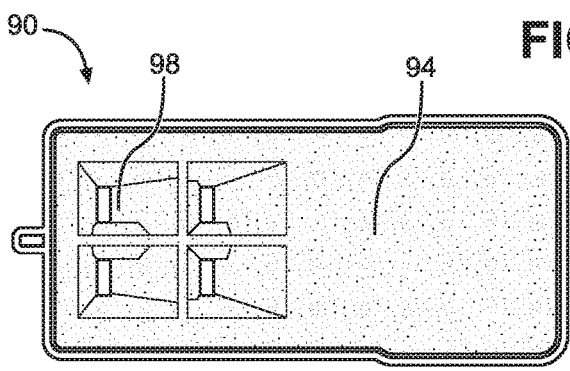
FIG. 23 is a top plan view of a cover for the fluid droplet ejection cartridge of FIG. 20.
Figure 24:
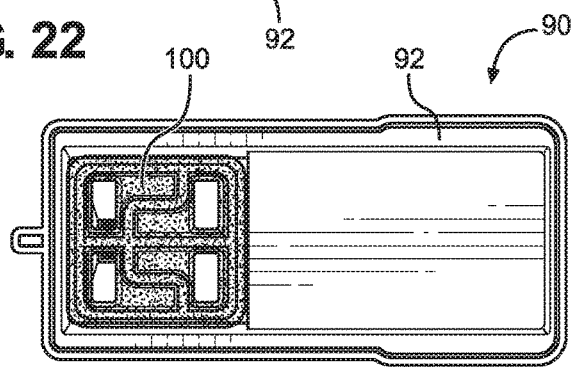
FIG. 24 is a top plan view, not to scale, of a chamber separator disposed in the open fluid droplet ejection cartridge of FIG. 20.

FIGS. 22-24 illustrate other aspects of the open fluid droplet ejection cartridge 90. In FIG. 22, a common chamber wall 106 is provided to separate the fluid chambers 108 from one another. FIG. 23 shows how the funnels 98 direct fluid into the fluid chambers 108. FIG. 24 illustrates the orientation of the chamber separator 100 in the cartridge body 92. Accordingly, the second embodiment provides an open-fluid droplet ejection cartridge 90 that can be used for ejecting up to four different fluids onto a substrate using the digital dispense system 10.

All of the cover and open fluid droplet ejection cartridge embodiments described above provide cover designs with relatively large openings 80, 84, and 96, in combination with large deep funnels 56, 86, and 98 that may be effective to reduce errors when manually filling the open fluid droplet ejection cartridges 50 and 90 with a pipette.

In some embodiments, the digital dispense system 10 may be used to deposit fluid into microwell plates 38 (FIG. 6). Filling of microwell plates for experimentation can be a time consuming manual task. It is desirable to be able to deposit fluid into multiple wells 42 at the same time to decrease the time required to prepare the microwell plate 38. Conventional digital dispense systems exist, however the conventional systems have dispense heads arranged in a linear fashion along a single axis. The dispense head chips containing fluid ejectors are placed individually on such dispense heads. The present disclosure provides an improved fluid dispense system 10 by combining multiple fluid vias on a single semiconductor substrate 102 where the fluid vias are disposed in a two-dimensional matrix. Such two-dimensional matrix enables the time to fill wells 42 in the microwell plate 38 to be significantly decreased. The two-dimensional matrix may also improve registration between the fluid vias and the microwell plate 38 since the fluid vias are formed through photolithography techniques rather than mechanical placing individual ejection heads onto a semiconductor substrate. Various two-dimensional matrices of fluid vias may be used such as a two-by-two matrix, a four-by-two matrix, a four-by-four matrix, up to and including, but not limited to an eight-by-two matrix or an eight-by-four matrix of fluid vias.

Figure 25:
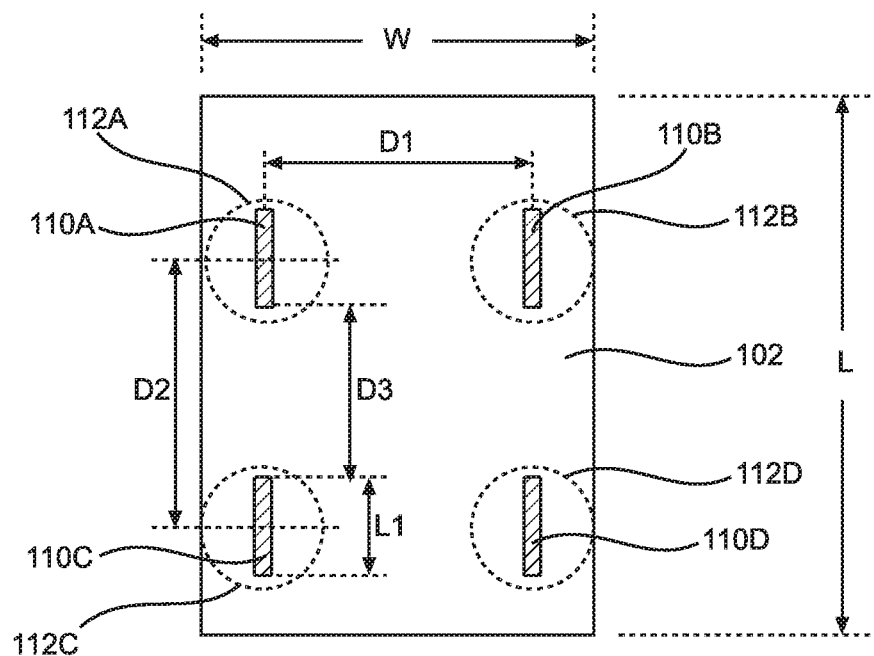
FIG. 25 is a plan view of a two-dimensional matrix of fluid vias for ejection devices on a single semiconductor substrate.

FIG. 25 is a plan view of the semiconductor substrate 102 containing four fluid vias 110A-110D on the semiconductor substrate 102 disposed in a two-by-two matrix. Ejection devices are disposed on both sides of the fluid vias in a conventional manner. The fluid vias 110A and 110B are spaced-apart a center-to-center distance D1 that corresponds to well 42 spacing on a microwell plate 38. In some embodiments, the center-to-center distance D1 between fluid vias 110A and 110B ranges from about 2 to about 9 millimeters (mm). In some embodiments, the center-to-center distance D1 between fluid vias 110A and 110B is about 4.5 mm. The circles 112A-112D represent the bottom of the wells 42 in the microwell plate 38 and are about 2000 microns in diameter. A center-to-center distance D2 between fluid via 110A and fluid via 110C also ranges from about 2 to about 9 mm, such as about 4.5 mm. The distance D3 between fluid vias 110A and 110C or 110B and 110D ranges from about 1 to about 5 mm, such as about 25 about 3.2 mm. In some embodiments, the substrate has a length L of about 7 to about 10 mm and a width W of about 5 to about 7 mm.

Figure 26:
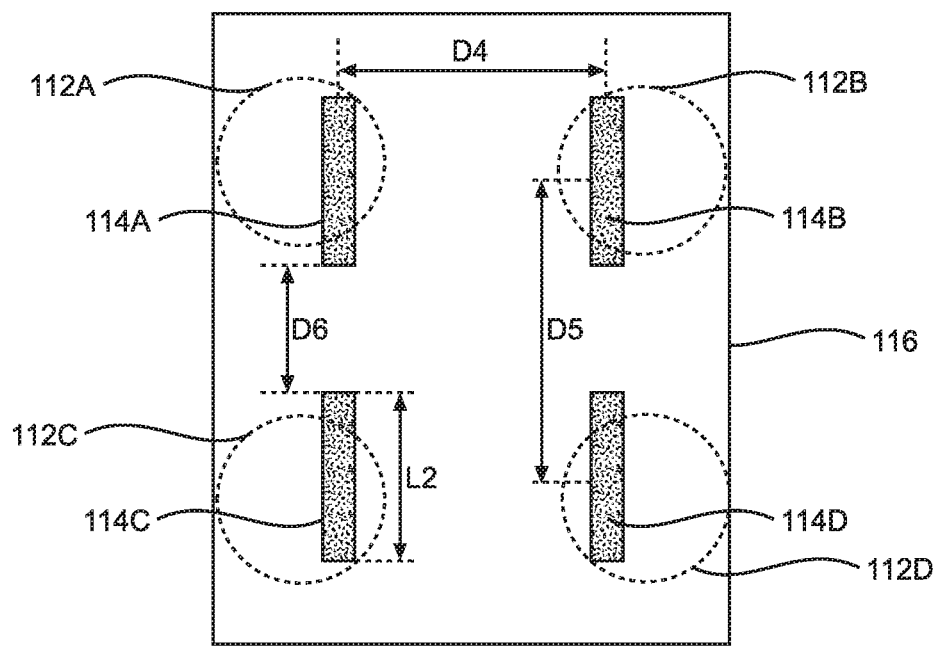
FIG. 26 is an alternative two-dimensional matrix of fluid vias for ejection devices on a single semiconductor substrate.

An alternate embodiment of fluid vias 114A-114D is shown in FIG. 26. The fluid vias 114A-114B on the substrate 116 may be spaced apart a different distance D4 than the fluid vias 110A-110B. In one embodiment, the fluid vias 114A and 114B are spaced apart a center-to-center distance D4 of about 2 to about 4 mm such as about 3.5 mm and fluid vias 114B and 114D are spaced apart a center-to-center distance D5 of about 3.5 to about 5 mm such as about 4.2 mm. The distance D6 between fluid vias 114A and 114C or 114B and 114D ranges from about 1 to about 2 mm such as about 1.7 mm. While the fluid vias 110A-110D have a length L1 that is slightly less than the diameter 112A-112D of the bottom of the wells 42, the fluid vias 114A-114D have a length L2 that is greater than the diameter 112A-112D of the bottom of the wells 42.

Figure 27:
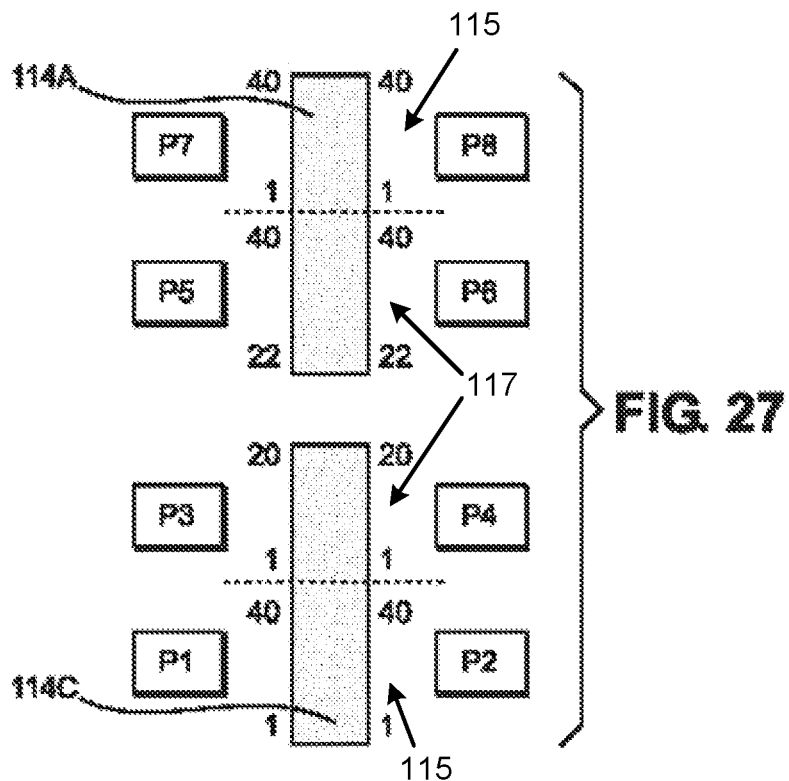
FIG. 27 is an address scheme for fluid ejectors adjacent fluid vias for a two-dimensional matrix of fluid vias for a first size of fluid ejectors.
Figure 28:
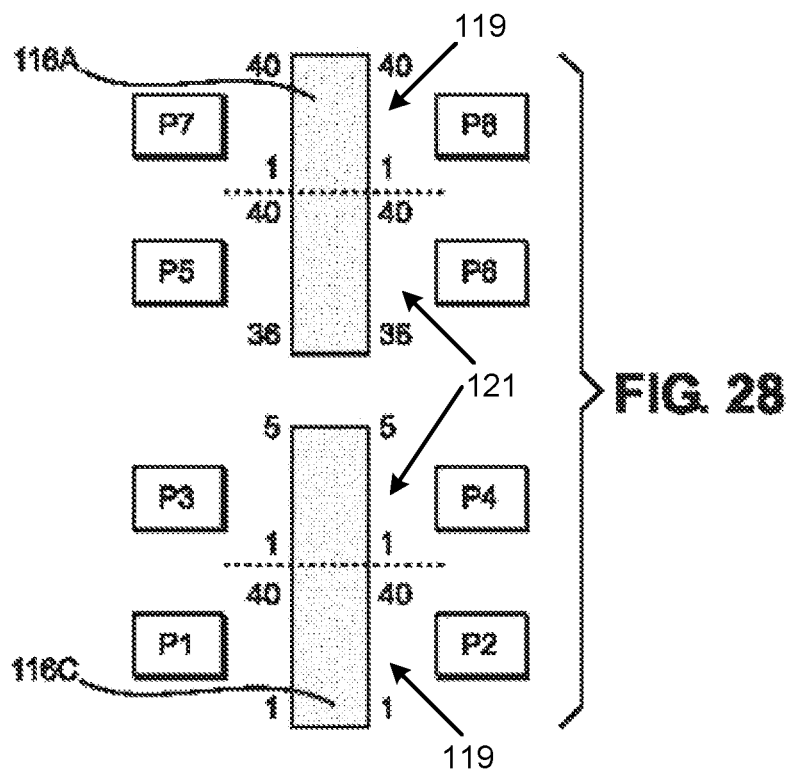
FIG. 28 is an address scheme for fluid ejectors adjacent fluid vias for a two-dimensional matrix of fluid vias for a second size of fluid ejectors.
Figure 29:
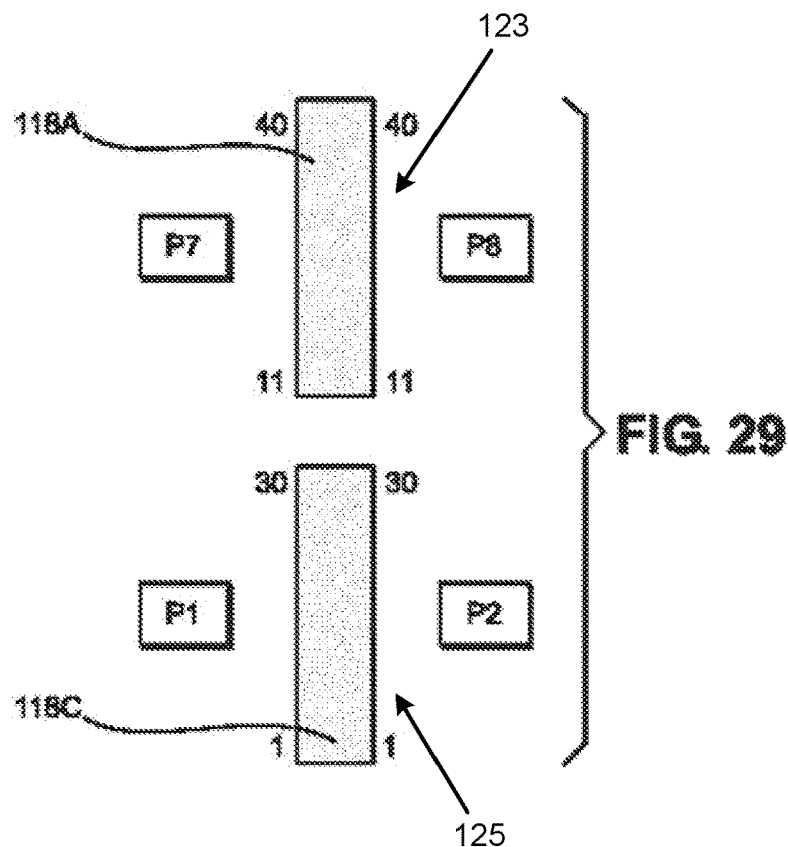
FIG. 29 is an address scheme for fluid ejectors adjacent fluid vias for a two-dimensional matrix of fluid vias for a third size of fluid ejectors.

FIGS. 27-29 illustrate addressing architectures for semiconductor substrates 102 or 116 containing a one-dimensional matrix of fluid vias, wherein P1-P8 represents the primitive addresses for sequencing the firing of ejection devices disposed on both sides of the fluid vias. The numbers along the perimeter of the fluid vias 114A and 114C represent the fluid ejectors in each ejection head. In FIG. 27, each fluid ejector dispenses 12 pL of fluid for example. Depending on the application it may be desirable to have small drop weight fluid ejectors along an array of fluid ejectors of the ejection head 114A or 114C. In FIG. 27, because of the smaller size of the fluid ejectors, there are 40 fluid ejectors 115 associated with primitive addresses P1, P2, P7 and P8 and 20 fluid ejectors 117 associated with primitive addresses P3, P4, P5, and P6. In FIG. 28, the fluid ejectors are larger and eject 24 pL droplets. Accordingly, there are still 40 fluid ejectors 119 associated with primitive addresses P1, P2, P7, and P8, but there are only 6 fluid ejectors 121 associated with primitive addresses P3, P4, P5 and P6. In another alternative embodiment, fluid ejectors that dispense 48 pL of fluid are disposed along vias 118A and 188C as shown in FIG. 29. In this embodiment, 30 fluid ejectors 123 are associated with each of the primitive addresses P1, P2, P7, and P8. Sharing a common addressing scheme between all fluid ejectors, regardless of the ejector size, reduces system integration complexity.

Accordingly, the digital dispense system 10 according to the disclosure can be used to deposit fluid into wells 40 of microwell plates 38, onto slides 36, onto circuit board substrates, or onto other substrates using the fluid ejection heads illustrated in FIGS. 25 and 26 disposed in a two-dimensional matrix of ejection heads. The two-dimension matrix of ejection heads provides improved registration accuracy between ejection heads, allowing for more precise filling of microwell plates, placement of droplets on a glass slide, or deposition of fluids on a circuit board substrate. By a common digital addressing architecture, multiple ejector fluid volumes can be digitally supported in the same dispense system as described above with reference to FIGS. 27 and 28.

Figure 30:
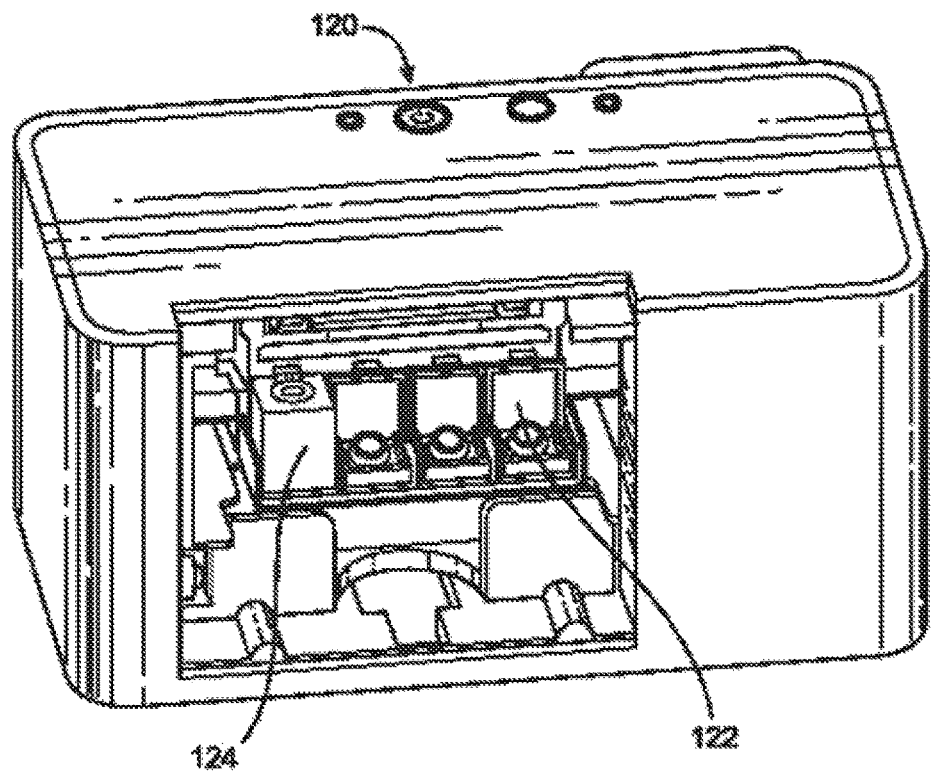
FIG. 30 is a perspective, cut-away view of a digital dispense system according to the disclosure containing both open and closed fluid droplet ejection cartridges.

The digital dispense system 10 described above can include one or more open fluid droplet ejection cartridges 50 or 90, or in an alternative embodiment, a digital dispense system 120 (FIG. 30) may include both open fluid droplet ejection cartridges 122 and pre-filled fluid droplet ejection cartridges 124. The pre-filled cartridge 124 is also referred to as a closed fluid droplet ejection cartridge. The open fluid droplet ejection cartridges 122 allow the user to add a small amount of fluid into the cartridge 122 at the time of use. The open fluid droplet ejection cartridge may be referred to as a pipette cartridge and may be used in biological analysis fields such as hematology.

While the foregoing embodiments particularly described fluid droplet ejection cartridges for three or four fluids, it will be appreciated that each fluid droplet ejection cartridge may be configured to dispense a single fluid, or two different fluids.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. An open fluid droplet ejection cartridge comprising:
a cartridge body with one or more fluid chambers disposed therein, wherein each of the one or more fluid chambers is configured to contain a fluid to be dispensed by a digital fluid dispense system;
a cover attached to the cartridge body, wherein the cover has one or more openings therein;
fluid funnels pending from each of the one or more openings in the cover into the cartridge body;
a chamber separator is attached to the fluid funnels and is configured to direct fluid from the fluid funnels into the one or more fluid chambers;
a fluid overflow area is provided between the one or more fluid chambers and the cartridge body and is configured for fluid overflow from the one or more fluid chambers;
a fluid supply slot is provided in the cartridge body in fluid flow communication with each of the one or more fluid chambers; and
a plurality of fluid ejection devices is provided on a single semiconductor substrate attached to an outside portion the cartridge body opposite the cover, wherein the plurality of fluid ejection devices are in fluid flow communication through the single semiconductor substrate with the fluid supply slots.

2. The open fluid droplet ejection cartridge of claim 1, wherein a gap is disposed between the chamber separator and the fluid funnels wherein the gap is configured to exhaust air from the one or more fluid chambers during fluid chamber filling.

3. The open fluid droplet ejection cartridge of claim 1, wherein the one or more fluid chambers comprise three fluid chambers wherein each of the three fluid chambers is configured to contain a different fluid to be dispensed by the digital fluid dispense system.

4. The open fluid droplet ejection cartridge of claim 1, wherein the one or more fluid chambers comprise four fluid chambers wherein each of the four fluid chambers is configured to contain a different fluid to be dispensed by the digital fluid dispense system.

5. The open fluid droplet ejection cartridge of claim 1, wherein the single semiconductor substrate comprises two or more fluid vias in fluid flow communication with the plurality of fluid ejection devices disposed in a two-dimensional matrix on the single semiconductor substrate.

6. The open fluid droplet ejection cartridge of claim 1, wherein the single semiconductor substrate comprise three fluid vias in fluid flow communication with the plurality of fluid ejection devices on the single semiconductor substrate.

7. A digital fluid dispense system comprising a housing unit, the open fluid droplet ejection cartridge of claim 1 disposed on a fluid cartridge translation mechanism within the housing unit, wherein the fluid cartridge translation mechanism is configured to move the open fluid droplet ejection cartridge back and forth over a fluid droplet substrate in an x direction, a substrate translation mechanism configured to move the fluid droplet substrate back and forth beneath the open fluid droplet ejection cartridge in a y direction orthogonal to the x direction; a power input is provided to the housing unit; and an activation switch is provided on the housing unit in electrical communication with the power input, wherein the activation switch is configured to activate the digital dispense system.

8. The digital fluid dispense system of claim 7 further comprising one or more sealed fluid droplet ejection cartridges disposed on the fluid cartridge translation mechanism.

9. A method for digitally dispensing fluid onto a fluid droplet substrate, comprising:
providing a fluid droplet ejection system housed in a housing unit, the fluid droplet ejection system including:
an open fluid droplet ejection cartridge having a cartridge body with one or more fluid chambers disposed therein, each of the one or more fluid chambers containing a fluid to be dispensed by the fluid droplet ejection system,
a fluid cartridge translation mechanism for moving the fluid droplet ejection cartridge back and forth over a fluid droplet substrate in an x direction,
a substrate translation mechanism for moving the fluid droplet substrate back and forth beneath the fluid ejection cartridge in a y direction orthogonal to the x direction, and
an activation switch on the housing unit in electrical communication with a power input,
wherein the open fluid droplet ejection cartridge comprises a cover attached to the cartridge body, the cover having one or more openings therein, fluid funnels pend from each of the one or more openings in the cover into the cartridge body, a chamber separator is attached to the fluid funnels for directing fluid into the one or more fluid chambers, a fluid overflow area is disposed between the one or more fluid chambers and the cartridge body for fluid overflow from the one or more fluid chambers, a fluid supply slot is provided in fluid flow communication with each of the one or more fluid chambers, and a plurality of fluid ejection devices is disposed on a semiconductor substrate attached to an outside portion of the cartridge body opposite the cover, wherein the plurality of fluid ejection devices are in fluid flow communication through the semiconductor substrate with the fluid supply slots;
pipetting one or more fluids into the one or more fluid chambers of the open fluid droplet ejection cartridge;
activating the fluid droplet ejection system using the activation switch; and
digitally dispensing one or more fluids onto the fluid droplet substrate.

10. The method of claim 9, wherein the substrate translation mechanism comprises one or more adapters for holding the fluid droplet substrate.

11. The method of claim 9, wherein the fluid droplet ejection cartridge comprises a single semiconductor substrate comprising a plurality of fluid vias etched therethrough.

12. The method of claim 11, wherein the single semiconductor substrate comprises the plurality of fluid vias disposed in a two-dimensional matrix through the single semiconductor substrate.

13. The method of claim 9, wherein the open fluid droplet cartridge comprises a gap disposed between the chamber separator and the fluid funnels wherein the gap is configured to exhaust air from the one or more fluid chambers during fluid chamber filling.

14. The method of claim 9, wherein the fluid droplet ejection system comprises a sealed fluid droplet ejection cartridge disposed on the fluid cartridge translation mechanism, wherein the sealed fluid droplet ejection cartridge contains one or more different fluids to be dispensed by the fluid droplet ejection system.

15. The method of claim 14, wherein the sealed fluid droplet ejection cartridge comprises a single semiconductor substrate comprising a plurality of fluid vias etched therethrough.

16. The method of claim 9, wherein the one or more fluid chambers in the cartridge body comprise three or four fluid chambers respectively containing three or four different fluids to be dispensed by the fluid droplet ejection system.

17. The method of claim 16, wherein the cover of the open fluid droplet ejection cartridge comprises three or four openings corresponding to the three or four fluid chambers.

\* \* \* \* \*